US012711041B2

(12) United States Patent
Huang et al.

(10) Patent No.: US 12,711,041 B2
(45) Date of Patent: Aug. 18, 2026

(54) SYSTEM AND METHOD FOR INTERACTIVELY DEBUGGING WEBASSEMBLY CODE

(71) Applicant: Bullish Global, Grand Cayman (KY)

(72) Inventors: Huang-Ming Huang, St. Louis, MO (US); Harry Yang, Williamsburg, VA (US); Santhosh Nagappa Kumaraswamy, Rocky Point, NY (US); Jiaen Du, Hong Kong (CN); Kevin Heifner, Pensacola, FL (US); Zhiqiang (Eric) Ma, Hong Kong (CN); Farhad Shahabi, Ashburn, VA (US); Jingjun Zhao, Blacksburg, VA (US); Keke Li, Freemont, CA (US); Victor Sanchez Camacho, Austin, TX (US); Patrick Raphael, Ashburn, VA (US); Lei Fu, Hong Kong (CN); Mothusi Sean Majinda, Hong Kong (CN)

(73) Assignee: Bullish Global, Grand Cayman (KY)

( * ) Notice: Subject to any disclaimer, the term of this patent is extended or adjusted under 35 U.S.C. 154(b) by 187 days.

(21) Appl. No.: 18/424,436

(22) Filed: Jan. 26, 2024

(65) Prior Publication Data

US 2024/0256428 A1 Aug. 1, 2024

Related U.S. Application Data

(60) Provisional application No. 63/482,297, filed on Jan. 30, 2023.

(51) Int. Cl.
*G06F 11/362* (2025.01)

(52) U.S. Cl.
CPC ...... *G06F 11/3624* (2013.01); *G06F 11/3636* (2013.01)

(58) Field of Classification Search
CPC ......................... G06F 11/3624; G06F 11/3636
(Continued)

(56) References Cited

U.S. PATENT DOCUMENTS 5,265,254 A * 11/1993 Blasciak ............. G06F 11/3636 713/502
5,956,479 A * 9/1999 McInerney ......... G06F 11/3698 714/E11.21

(Continued)

OTHER PUBLICATIONS

Meier et al, "CertiCoq-Wasm: A VerifiedWebAssembly Backend for CertiCoq", ACM, pp. 1-13 (Year: 2025).*

(Continued)

*Primary Examiner* — Anil Khatri
(74) *Attorney, Agent, or Firm* — Norton Rose Fulbright US LLP

(57) ABSTRACT

Embodiments relate to interactively debugging non-native code inside native executables to identify erroneous execution logic and/or performance issues. The non-native code can be WebAssembly (WASM) code. Source smart contract code can be converted into a native binary in a format of a shared library. The shared library can be loaded by a blockchain executable when ready to load the smart contract for execution, and execution control can be passed to the shared library. A debugger can be attached to the host executable and single step through the smart contract code invoked. Embodiments relate to enabling interactive debugging of code as shared libraries (.so files) inside blockchains and native executables and/or generating execution trace information for smart contracts from non-native code without modifying its execution logic and/or generating relative performance information comparing smart contract execution in blockchains as non-native code with native execution as shared libraries to establish performance benchmarks.

19 Claims, 9 Drawing Sheets

(58) Field of Classification Search
USPC .................................................. 717/124–140
See application file for complete search history.

(56) References Cited

U.S. PATENT DOCUMENTS

| | | | | |
|---|---|---|---|---|
| 6,804,814 | B1 * | 10/2004 | Ayers .................. | G06F 11/3644 717/130 |
| 8,312,435 | B2 * | 11/2012 | Wygodny ........... | G06F 11/3636 717/124 |
| 8,745,597 | B2 * | 6/2014 | Kandasamy ........ | G06F 11/3644 717/124 |
| 10,133,654 | B1 * | 11/2018 | Deiderich, III ..... | G06F 11/3636 |
| 11,151,018 | B2 * | 10/2021 | Li ....................... | G06F 11/3644 |
| 11,170,098 | B1 * | 11/2021 | Ben-Dor ................. | G06F 21/54 |
| 11,398,911 | B1 * | 7/2022 | Gunning ............. | G07F 17/0014 |
| 11,768,757 | B2 * | 9/2023 | Liu ....................... | G06F 11/362 717/124 |
| 11,848,758 | B1 * | 12/2023 | Dods ...................... | G16H 20/10 |
| 12,182,004 | B2 * | 12/2024 | Taber .................. | G06F 21/6254 |
| 12,353,524 | B2 * | 7/2025 | Yue ......................... | G06F 21/64 |

OTHER PUBLICATIONS

Hilbig et al, “An Empirical Study of Real-WorldWebAssembly Binaries”, ACM, pp. 1-13 (Year: 2021).*
Kolluri et al, “Exploiting the Laws of Order in Smart Contracts”, ACM, pp. 1-12 (Year: 2019).*
He at el, “Learning to Fuzz from Symbolic Execution with Application to Smart Contracts”, ACM, pp. 1-19 (Year: 2019).*
Wang et al, “FPGA Interactive Debugging Tools Testing via Mutation Diversification Search”, ACM, pp. 1-20 (Year: 2026).*

* cited by examiner wasm native .so based debuggin use case in Browser wasm native .so based debuggin use case in Blockchain - debugging and execution are in the same node wasm native .so based debuggin use case in blockchain

- the execution is in node 1 by running wasm binary code
- the debugging is done in node 2 by running native .so code, with replicated states and steps as from node 1

SYSTEM AND METHOD FOR INTERACTIVELY DEBUGGING WEBASSEMBLY CODE

CROSS REFERENCE TO RELATED APPLICATIONS

This application claims the benefit of priority to U.S. Provisional Patent Application No. 63/482,297, entitled "SYSTEM AND METHOD FOR INTERACTIVELY DEBUGGING WEBASSEMBLY CODE," filed on Jan. 30, 2023, the disclosure of which is hereby incorporated by reference herein in its entirety as if fully set forth below and for all applicable purposes.

FIELD

The improvements generally relate to the field of distributed computer systems, executable programs, debugging code, WebAssembly, smart contract code, trading platforms, blockchains, and blockchain infrastructure.

INTRODUCTION

Distributed computer systems can implement different decentralized applications and platforms. For example, distributed computer systems can implement exchange platforms. Embodiments described herein relate to a distributed computing platform that connects to electronic devices. For example, an exchange platform can connect to electronic devices to receive order commands to buy, sell and trade cryptocurrencies and digital assets. Embodiments described herein relate to a distributed platform with a blockchain infrastructure integrating cryptographic and security tools.

Embodiments described herein relate to systems and methods for improved debugging tools for decentralized platforms. Embodiments described herein relate to systems and methods for interactively debugging code in non-native format inside native executables to identify erroneous execution logic and/or performance issues in the code. An example non-native format is WebAssembly (WASM) which is a web standard or protocol that defines a portable binary-code format and a corresponding text format for executable programs and software interfaces to facilitate interactions between such programs and their host environment. WASM is an open standard that supports different languages and operating systems.

Embodiments described herein relate to an exchange platform with smart contracts for executing trades on blockchain infrastructure. WASM can be used as a standard for executing smart contract code of the exchange platform. For example, smart contract code can be compiled into WASM format for execution.

There exists a need for improved smart contract execution on blockchain platforms with optimal performance. There exists a need for improved debugging of smart contract code for an exchange platform that executes the code using WASM.

SUMMARY

In an aspect, embodiments described herein provide systems and methods for debugging code of decentralized platforms. For example, systems and methods can be used for exchange platforms for trading assets, such as digital assets.

Embodiments relate to systems and methods for interactively debugging code in a non-native format inside native executables to identify erroneous execution logic and/or improve execution performance of these contracts. Source smart contract code can be converted into a native binary in a format of a shared library. The shared library can be loaded by a blockchain executable when ready to load the smart contract for execution, and execution control can be passed to the shared library. A debugger can be attached to the host executable and single step through the smart contract code when invoked. For example, the non-native format can be WebAssembly (WASM) code. Further examples of non-native formats include programming languages such as Java™ Byte code and Solidity.

Since the blockchain is a deterministic state machine, the same contract code executed as WASM (.wasm file) and as the native shared library (.so file) must result in the same outcomes for the program. Embodiments described herein leverage this deterministic state machine feature of the blockchain to ensure that the debugging information generated from the shared library is identical to that obtainable from the WASM file and thus facilitate debugging of the execution logic of the smart contract code.

Embodiments described herein also provide benefits such as benchmarking the maximum speed of execution of smart contracts on the blockchain as native execution represents the best possible speed of execution and enables developers to better debug and optimize their WASM code to achieve the best possible execution speed on the blockchain.

Embodiments relate to systems and methods for automatically inserting execution tracing code during smart contract compilation into WASM format without changing any execution logic of the contract so as to cause the blockchain execution of the smart contract to print each source code line number and associated variable values, function names, and entry and exit criteria before said code is executed to enable developers to manually debug the execution logic from the execution traces obtained from live production usage of such enhanced WASM files.

In an aspect, embodiments described herein provide a method for interactively debugging code in non-native format inside native executables.

The method can involve converting source code of a smart contract in non-native format into a native binary in a format of a shared library that is functionally equivalent to the non-native format that would be executed on a blockchain, loading the shared library by a blockchain host executable when ready to load the smart contract code for execution, and attaching an interactive debugger to the host executable for debugging the smart contract code. Execution control is passed to the shared library. The smart contract source code lines are visible and controllable from within the interactive debugger. Converting the source code of the smart contract code into the native binary in the format of the shared library and the equivalent WASM binary produces functionally equivalent code that is verifiable as both versions execute identically within the blockchain host executable that is a deterministic state machine and produce identical outputs for given inputs facilitating use of debugging information made available by the native shared library binaries via the interactive debugger for further developing the smart contract.

In some embodiments, the non-native format is WebAssembly (WASM).

In some embodiments, the method involves using the debugger to identify erroneous execution logic and/or performance issues in the code.

In some embodiments, the method involves attaching the debugger to the host executable for debugging by single stepping through the smart contract code.

In some embodiments, the method involves providing the smart contract source code lines being executed and program variables values as visible and controllable from within the interactive debugger.

In some embodiments, the method involves attaching a debugger to native execution of smart contract code and iterating through program steps of the smart contract code.

In some embodiments, the method involves comparing execution of the smart contract code in one or more blockchain executables to identify performance differentials between WebAssembly (WASM) execution and optimal performance execution achieved by native shared libraries.

In some embodiments, the method involves automatically inserting execution traces in the smart contract code prior to code compilation without changing the base behaviour of the smart contract code to generate additional debug execution trace information at runtime including outputting line numbers of source code being executed, functions executed, values of variables used at run-time, etc.

In some embodiments, the method involves debugging by single stepping through host code execution of the host functions called by the smart contract.

In some embodiments, the method involves converting the source code of the smart contract code into a WebAssembley (WASM) binary for execution in a WASM virtual machine of the host executable.

In some embodiments, the method involves converting the source code of the smart contract code into the native binary in the format of the shared library and the WASM binary includes generating shared library binaries and WASM binaries, wherein the generated shared library binaries and the WASM binaries are from the same intermediate representation of the smart contract source code, wherein, during execution, the generated shared library binaries and WASM binaries have the same execution behavior at each step and their identical execution behavior can further be verified by the deterministic blockchain based identical outputs being generated for identical inputs by both the WASM and shared libraries generated from the same source files.

In some embodiments, the converting further involves inserting source-level debugging information into the native binary in the format of the shared library to facilitate working with the interactive debugger.

In another aspect, embodiments described herein provide a method for interactively debugging non-native code inside native executables to identify erroneous execution logic in the code or performance issues. The method involves debugging by single stepping through shared library binaries of the code during host code execution of smart contracts, and/or generating execution tracing information, and/or comparing relative performance of the non-native code and native shared library execution of identical contracts.

In a further aspect, embodiments described herein provide a system for interactively debugging code in non-native format inside native executables.

In some embodiments, the system has a memory for a shared library of native binaries; a hardware processor executing instructions to provide a compiler for converting source code for a code of smart contract code in non-native format into a native binary in a format of the shared library; a host executable to load the shared library for execution of the smart contract code, wherein execution control is passed to the shared library; and an interactive debugger attached to the host executable for debugging the smart contract by the host code execution of the host functions called by the smart contract code to generate debugging data and/or execution traces and/or information on the relative performance of the code in non-native format and shared library execution of the same contracts.

In some embodiments, the non-native format is WebAssembly (WASM).

In some embodiments, the debugger attached to the host executable is configured for debugging by single stepping through the smart contract code.

In some embodiments, the compiler automatically inserts execution traces in the smart contract code without changing the base behaviour of the smart contract code.

In some embodiments, the hardware processor automatically creates tracing code for the smart contract execution, wherein during execution of the smart contract code the tracing code runs without changing logic of the smart contract code to generate execution traces for the tracing.

In some embodiments, the compiler converts the source code of the smart contract code into a WASM binary for execution in a WASM virtual machine of the host executable.

In some embodiments, the compiler generates shared library binaries and WASM binaries from the same intermediate representation of the smart contract source code, wherein, during execution, the generated shared library binaries and WASM binaries have the same execution behavior at each step.

In some embodiments, the compiler inserts source-level debugging information into the native binary of the shared library.

In a further aspect, embodiments described herein provide a method for debugging smart contract code of a computing platform with a blockchain infrastructure. The method involves: converting source code of smart contract code into native binaries for execution in a shared library of a host executable and converting the source code of the smart contract code into WASM binaries for execution in a WASM virtual machine of the host executable; and debugging by single step through host code execution of host functions called by the smart contract code, and tracing and showing internal data structure and status during execution of the smart contract code; wherein the blockchain infrastructure is a deterministic state machine, wherein the smart contract code executed as the WASM binaries and the native binaries of the shared library result in the same outcomes for the smart contract code; wherein the debugging data generated from the native binaries of the shared library can be generated from the WASM binaries; and wherein debugging information and/or execution traces and/or information on the relative performance of WebAssembly (WASM) versus native shared library execution of the same contracts can be generated.

In a further aspect, embodiments described herein provide a method for debugging smart contract code of a platform with a blockchain infrastructure. The method involves: converting source code of smart contract code in non-native format into native binaries for execution in a shared library of a host executable and converting the source code of the smart contract code into binaries for execution in a virtual machine of the host executable; and debugging by single step through host code execution of host functions called by the smart contract code, and tracing and showing internal data structure and status during execution of the smart contract code; wherein the blockchain infrastructure is a deterministic state machine, wherein the smart contract code executed as the non-native binaries and the native binaries of the shared library result in the same outcomes for the smart contract code; wherein the debugging data generated from the native binaries of the shared library can be generated from the binaries; and wherein debugging information and/or execution traces and/or information on the relative performance of non-native versus native shared library execution of the same contracts can be generated.

In another aspect, embodiments described herein provide a system for debugging smart contract code of a platform with a blockchain infrastructure.

In a further aspect, embodiments described herein provide a non-transitory machine readable medium having stored thereon a plurality of instructions that, when executed by at least one computing device, cause the at least one computing device to perform a method described herein.

DESCRIPTION OF THE FIGURES

In the figures.

DETAILED DESCRIPTION

Figure 1:
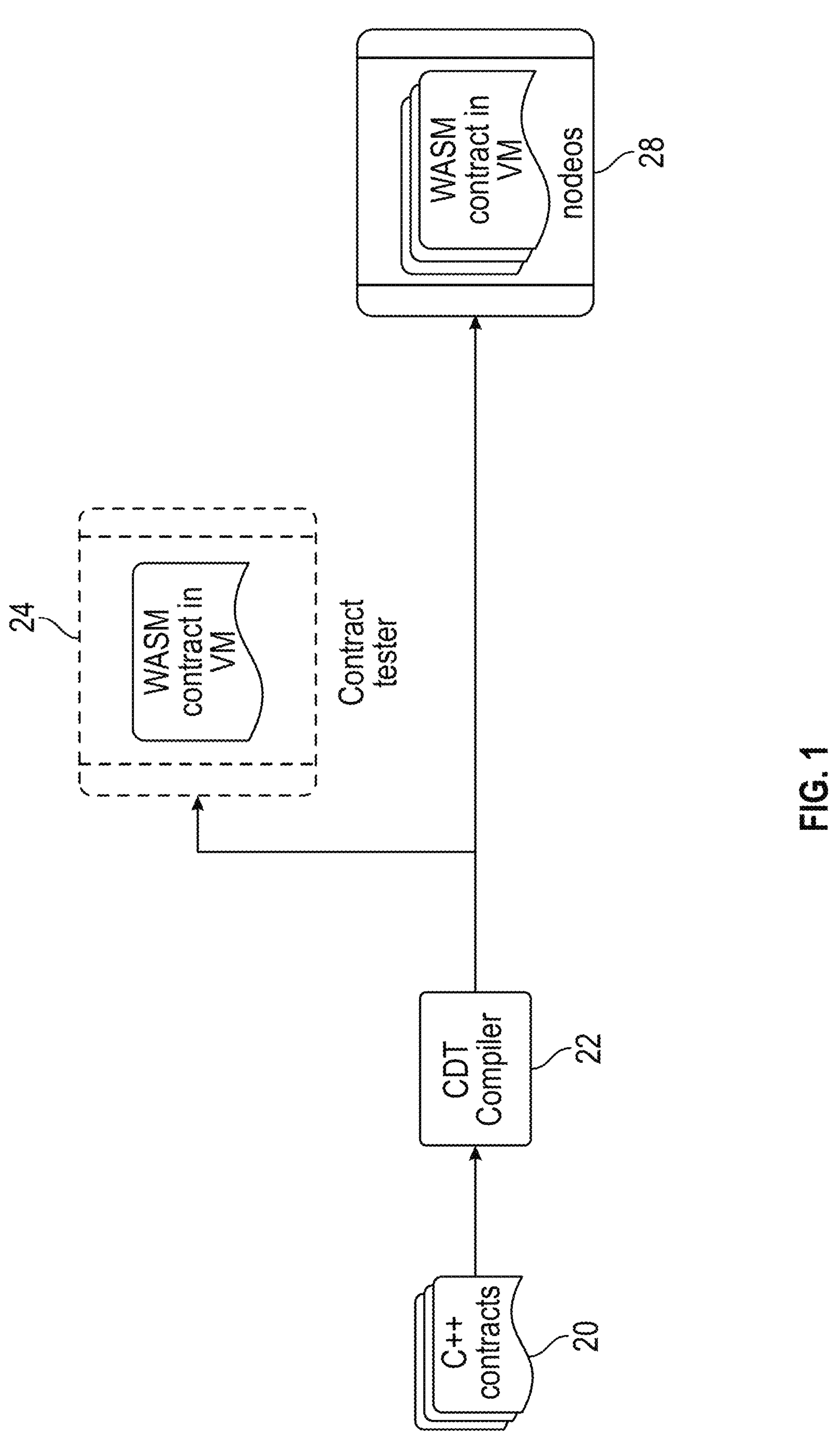
FIG. 1 shows a schematic diagram of code testing and execution in a blockchain.

Embodiments described herein can provide systems and methods for debugging non-native code inside native executables. For example, the non-native format can be WebAssembly (WASM) code. Further examples of non-native formats include programming languages such as Java™ Byte code and Solidity. Some embodiments described herein can provide systems and methods for debugging WASM code (e.g., smart contracts) of decentralized platforms. As an illustrative example, the decentralized exchange platforms can be for trading assets, such as digital assets.

An exchange platform can connect electronic devices to buy, sell, and trade cryptocurrencies using smart contract codes to control exchange commands on blockchain platforms. An exchange platform can involve a new hybrid order book integrating an automated market maker (AMM) with a central limit order book. The hybrid order book involves a matching engine. An AMM can use a formula to calculate the rate or price, and does not use a central limit order book (ask and bid orders) for the rate or price as used for a traditional exchange. Cryptocurrencies are priced according to a pricing process calculated using the AMM. Further details are provided in International Application No. PCT/US2022/038593 entitled TRADING PLATFORM INTEGRATING AUTOMATED MARKET MAKER AND ORDER BOOK, filed on Jul. 27, 2022, the entire contents of which is hereby incorporated by reference.

A distributed computing platform can involve different software and hardware components implemented using smart contracts compiled as, e.g., WASM code. For example, an exchange platform can use blockchain infrastructure for implementing a decentralized exchange. Embodiments described herein relate to a distributed computing platform with smart contract code programmed to execute on the blockchain infrastructure. WASM is a web standard for executing code that is an example non-native format for embodiments described herein. WASM can be used for executing smart contract code of the exchange platform. For example, smart contract code can be compiled into WASM for execution. Debugging code compiled using WASM can be challenging in this environment. For example, debugging WASM code in this process can be challenging given the transformations of the source programming language (for example C++) smart contract code into WASM code. As another example, WASM is based on a stack but WASM currently does not support stack unwinding. Therefore it is not possible to get a stack trace as needed for debugging. Further, current debugging standards, such as debugging with attributed record formats (DWARF), practically do not support WASM debugging.

Embodiments described herein can provide systems and methods for comparing smart contract execution in blockchains with optimal performance.

Embodiments described herein can provide systems and methods for interactively debugging smart contract codes to identify erroneous execution logic and/or performance issues. For example, systems and methods can attach a debugger to the native execution of smart contracts and single step through smart contracts. Single stepping through the code allows a developer to execute one single statement of the code at a time, so as to observe the results of each statement one by one. The developer can step over to the next statement, or step into the nested subroutine invoked by the current statement, to continue single step debugging.

Embodiments described herein can provide systems and methods for inserting execution tracing code during smart contract compilation into WASM format without changing the base behavior of the smart contract. These inserted code statements can allow programmers to follow the execution trace of the smart contract line-by-line as it executes and outputs the corresponding line number of execution within the source programming language (e.g., C++) file along with any variable and function names that are being entered and exited from. This detailed execution trace enables the programmer to debug the execution logic of the WASM code directly when it is executed on the blockchain Embodiments described herein can interactively debug WASM code beyond the blockchain environment. For example, systems and methods can debug browsers running WASM code. This can provide a generalized way to interactively debug WASM code inside native executables. Accordingly, some embodiments described herein are not limited to the blockchain environment, and can be used in the context of a web-browser running a WASM module, for example.

Referring to FIG. 1, there is shown a schematic diagram of code testing.

In this example, a smart contract 20 can be programmed using source C++ code. For testing, the source C++ smart contract 20 can be converted by a Contract Development Toolkit (CDT) compiler 22 into WASM format and executed in a virtual machine (VM) in the blockchain executable (nodeos) 28. A contract tester component 24 can test and validate the WASM contract code in the VM. This testing process may be implemented in blockchain platforms where the smart contract code is executed in a VM. For some types of blockchain implementations, the C++ smart contract 20 can be converted to WASM format and executed in a WASM VM. For other types of blockchains, smart contracts 20 can be coded using Solidity which is an object-oriented programming language for implementing smart contracts on various blockchain platforms. In such blockchain implementations, Solidity smart contract code can be converted to Opcodes and executed in a VM in the blockchain platform.

Figure 2:
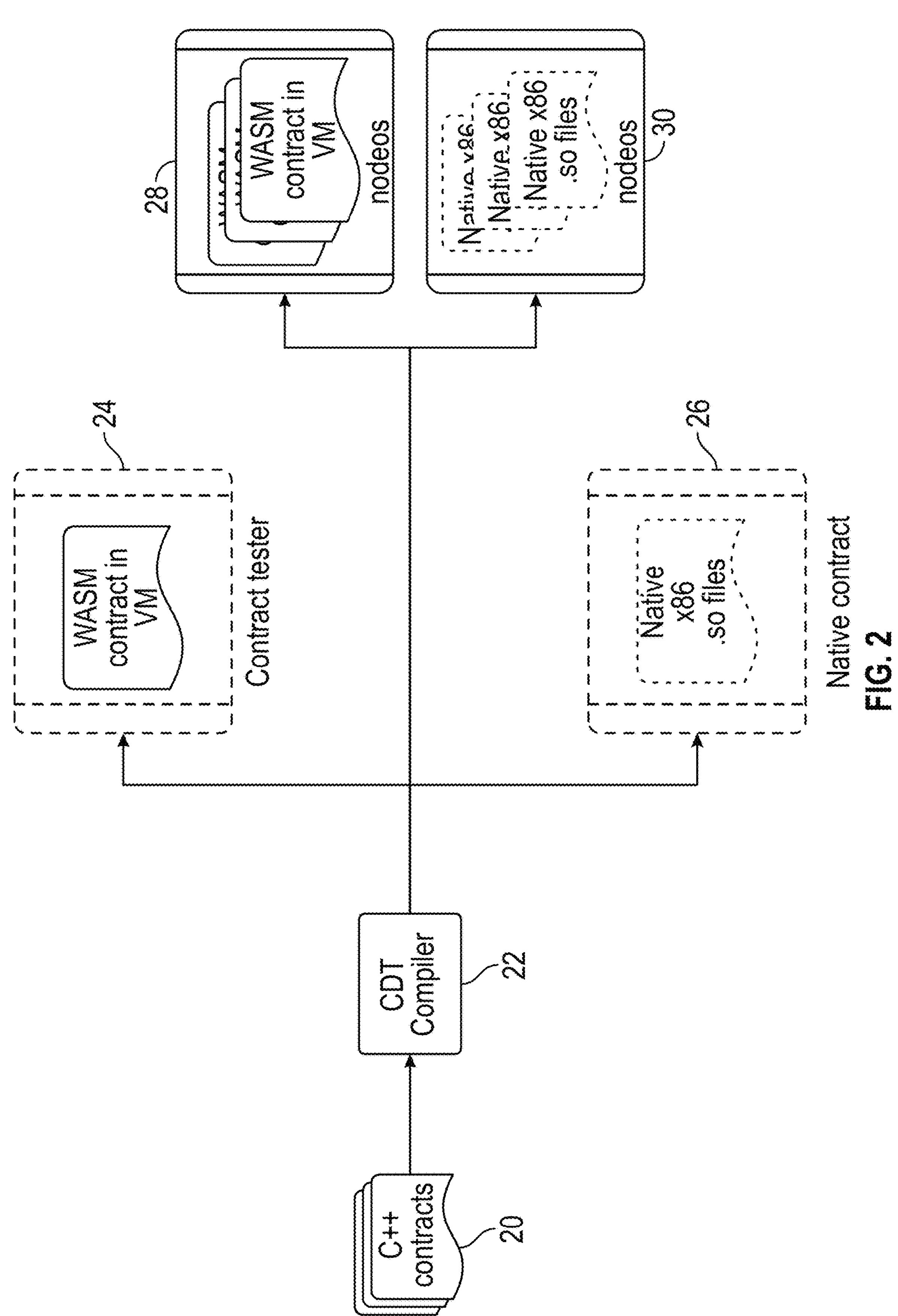
FIG. 2 shows a schematic diagram of code testing and debugging according to embodiments described herein.

Referring to FIG. 2, there is shown a schematic diagram of code testing and debugging according to embodiments described herein.

In this testing/debugging example according to embodiments described herein, the source C++ smart contract code 20 can be converted by a CDT compiler 22 into a native binary 26 in the format of a shared library (e.g., native x86 .so files). This shared library 26 can be loaded by the blockchain executable (nodeos) 30 when it is ready to load a smart contract for execution, and execution control can be passed to that shared library. The source C++ smart contract code 20 can also be converted by a CDT compiler 22 into a WASM binary and executed in a WASM VM in the blockchain executable (nodeos) 28. In this example, nodeos components refer to host executables or host programs or host environments, such as blockchain executables, web browser applications, WASM driven hardware units (e.g., Internet of Things devices), and so on. The CDT compiler 22 can ensure the generated shared libraries and WASM binaries are from the same intermediate representation of the source code. Therefore, the generated shared libraries and WASM binaries can have the same execution behavior, such as data structure values at each single step. Further, since the blockchain is a deterministic state machine, the same contract executed as WASM (.wasm file) and as the native shared library (.so file) must result in the same outputs for the same input values across the two versions. Embodiments described herein can leverage this deterministic state machine feature of the blockchain to ensure that the debugging information generated from the shared library (.so file) is identical to that obtainable from debugging the WASM file and thus facilitate debugging of the execution logic and performance characteristics of the smart contracts involved.

While a contract tester component 24 can test or validate the WASM contract in the VM, an interactive debugger such as gdb or lldb can single step through the original programming language (e.g., C++) contract source code of the smart contract as it is being executed in the native binary in the format of the shared library (e.g., native x86 .so files) while showing the corresponding lines of C++ source code associated with that location in the smart contract binary along with its execution context (variables, stack frames, etc.) for testing and debugging. The contract tester component 24 can validate the behavior of the smart contract WebAssembly code inside native executables to identify erroneous execution logic. The debugger can single step through the code (e.g., execute one single statement of the code at a time) so as to observe the results of each statement one by one. The debugger can step over to the next statement, or step into the called subroutine by the current statement. The native shared library 26 can have a code correspondence to the source C++ smart contract code 20 which can enable debugging. As noted, the CDT compiler 22 can ensure the generated shared library binaries and WASM binaries are from the same intermediate representation of the source code. This can be useful for single step debugging, as the generated shared library binaries and WASM binaries have the same execution behavior (e.g., data structure values) at each single step. Embodiments described herein can attach a debugger to the native execution of smart contracts and single step through code of smart contracts using the native code to observe the behavior of the smart contract.

As the blockchain is a deterministic state machine (which implies that the same inputs must produce the same outputs irrespective of how the execution is carried out), the same contract executed as WASM (.wasm file) and as a native shared library (.so file) must result in the same outputs for the program. Embodiments described herein can leverage this deterministic state machine feature of the blockchain to ensure that the debugging information generated from the shared library are identical to that obtainable from any other way of debugging the WASM file and thus facilitate debugging of the execution logic of the smart contracts while also displaying the corresponding lines of source C++ files and the executing contract's execution context within the native shared library (.so file).

In this example, the smart contract is executing as native instructions. Accordingly, the native binary of the smart contract in the format of a shared library represents the optimal execution speed of the smart contract code and can represent the fastest execution possible on the given central processing unit (CPU) and operating system (OS) combination. All WebAssembly (WASM) contract execution inside the VM running inside the blockchain executable (nodeos) will represent a slower speed. Therefore native execution of smart contract code can also enable estimation and benchmarking of the optimal execution speed for smart contract code on the blockchain for the given target CPU and OS combination. This can allow smart contract code to be further fine tuned for WASM generation and execution to try and meet the optimal performance benchmarks established by native execution of the same deterministic code Further, since smart contract execution can be compiled with various compiler provided optimization switches, the native binary of the smart contract in the shared library can provide a sense for the best case execution speed.

In addition, since the host blockchain executable is loading a native shared library object and executing the native shared library object, a debugger can be attached to the host executable to single step through the smart contract code when it is invoked. For example, the debugger can be attached to the host executable by operating system calls, such as ptrace( ) which allows the debugger to observe and manipulate the execution of the host executable. It can be challenging to debug WASM code in a VM which involves transformations of the C++ smart contract. Instead, according to embodiments described herein, native code in the shared library can be executed directly in the blockchain executable (nodeos) and debugged inside the same host program that is running the smart contract code. Accordingly, embodiments described herein can provide an improved system and method for debugging WASM code.

As noted herein, some embodiments described herein are not limited to the blockchain environment. For example, the testing and debugging described here can also be performed in the context of a web-browser or other software or hardware running a WASM module enabling very effective debugging capabilities for WASM.

Embodiments described herein can also provide additional ways of generating debug information from a smart contract compiler by automatically inserting execution traces into the source code without changing the base behavior of the smart contract. The CDT compiler 22 can use static analysis to provide execution tracing for smart contracts. In the beginning phase of compilation, the source code can be analyzed to generate an Abstract Syntax Tree (AST) structure. Then tracing code can be automatically created for the smart contract execution, such as function enter and exit traces, statement-level traces, function parameter traces, etc. When the smart contract is compiled into WASM format these traces can be compiled along with the base logic of the contract itself and therefore can be executed during normal execution of the WASM contract. Since the tracing code also runs (without changing the smart contract logic) and generates the execution trace, these traces can be used for debugging purposes in live execution environments and can provide valuable debugging information to developers Referring to FIG. 3, there is shown another schematic diagram of code testing according to embodiments described herein. The diagram illustrates how the WASM binary and the equivalent native shared library code generation is accomplished by a CDT compiler 22.

As an illustrative example, the CDT compiler 22 can be based on LLVM and adds in this example, EOS.IO-specific features and libraries. LLVM is a set of compiler and toolchain technologies that can be used to develop a front end for any programming language and a back end for any instruction set architecture. Various compiler and toolchain technologies can be used for other embodiments. EOS.IO is a blockchain protocol that powers the cryptocurrency EOS and a number of other cryptocurrency projects. Various blockchain protocols and cryptocurrencies can be used for other embodiments.

Figure 3:
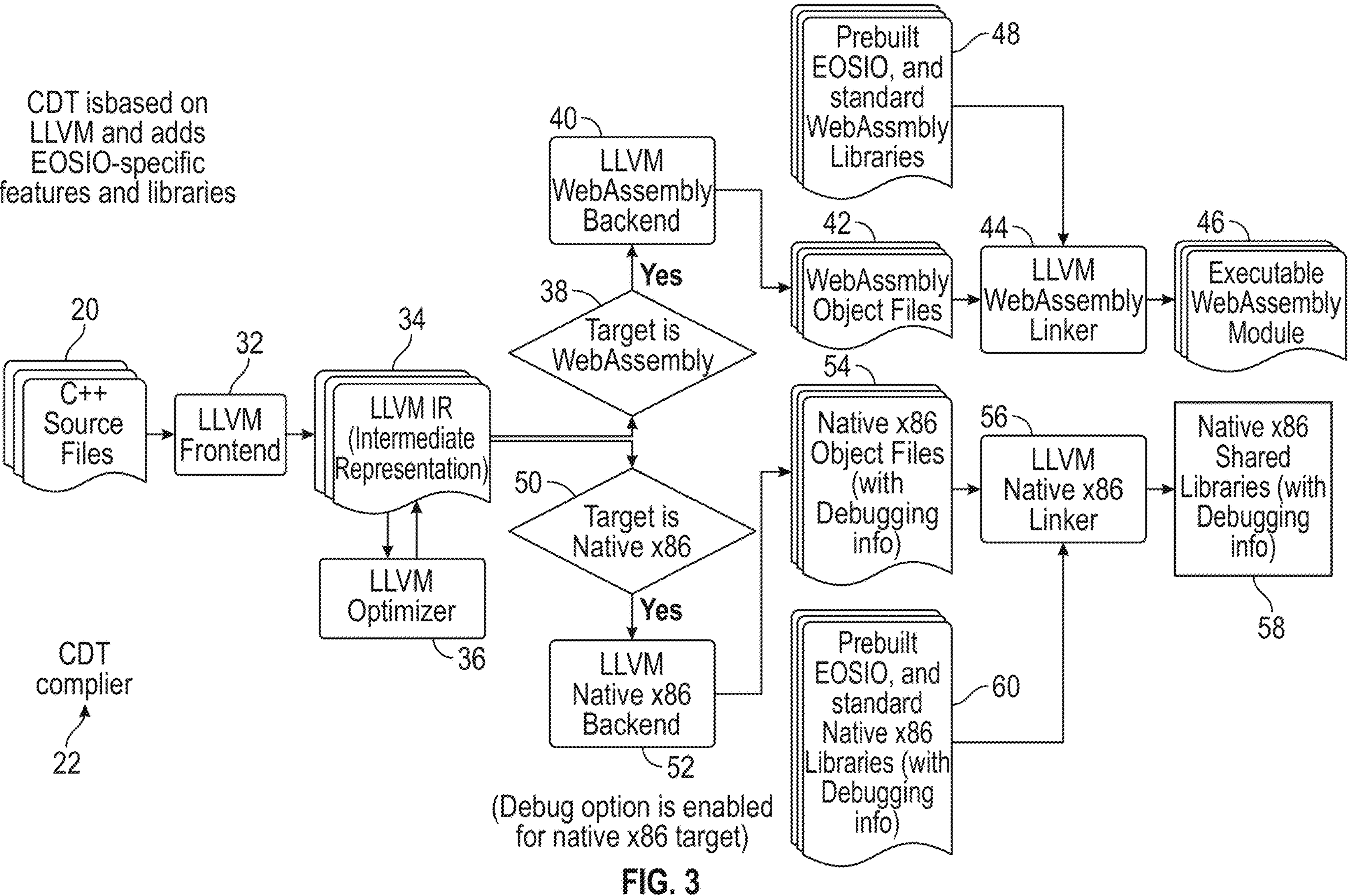
FIG. 3 shows another schematic diagram of code testing according to embodiments described herein.

As shown in FIG. 3, the CDT compiler 22 can compile the source C++ smart contract code 20 using an LLVM frontend 32 which converts the source C++ smart contract code 20 to an LLVM intermediate representation (IR) 34 smart contract using an LLVM optimizer 36.

If the target output requested is a WASM binary (.wasm file), at 38, the CDT compiler 22 can determine that the target is a WASM binary and the LLVM WASM backend 40 can convert the LLVM IR 34 smart contract into WASM object files 42. An LLVM WASM linker 44 can use precompiled WASM libraries 48 to generate an executable WASM module 46 of the smart contract that can be executed on the blockchain.

If the target output requested is a shared library (.so file), at 50, the CDT compiler 22 can determine that the target is a native binary in the format of a shared library (e.g., native x86 .so files) and the debugging option can be enabled for the native binary (e.g., x86) target. An LLVM native x86 backend 52 can convert the LLVM IR 34 smart contract into native x86 object files 54 with debugging information. An LLVM native x86 linker 56 can use precompiled native x86 libraries 60 (with debugging information) to generate native x86 shared libraries 58 (with debugging information) for the smart contract. The resulting shared library 58 can be loaded by the host program (nodeos) and used for interactive debugging of the smart contract execution. This process can be used for blockchain executables, web browser applications, WASM hardware units, and so on.

According to embodiments described herein, debug options can be enabled for the native binary target. For example, for the native x86 target, a compiler flag that enables debugging can be added, so that source-level debugging information, such as descriptors for data types, variables, functions, and source files, are inserted in the generated shared library binary. This debugging information can be used by debuggers during interactive debugging sessions.

Figure 4:
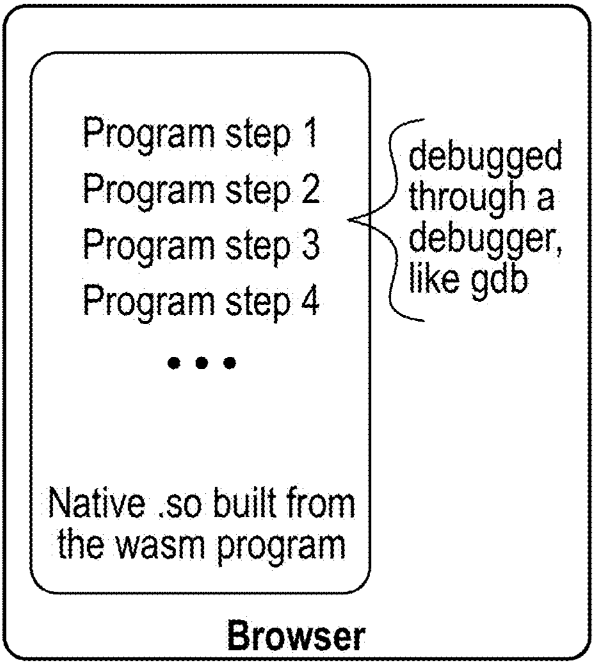
FIG. 4, FIG. 5, and FIG. 6, show example use cases to illustrate debugging functionality.
Figure 5:
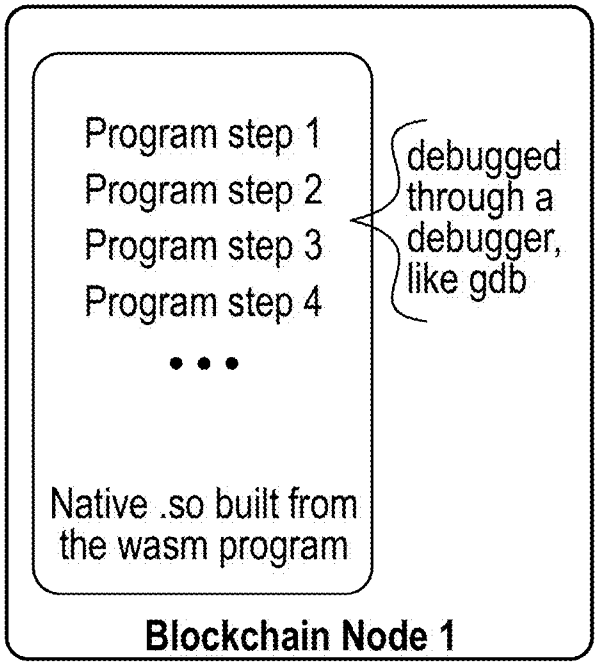
Figure 6:
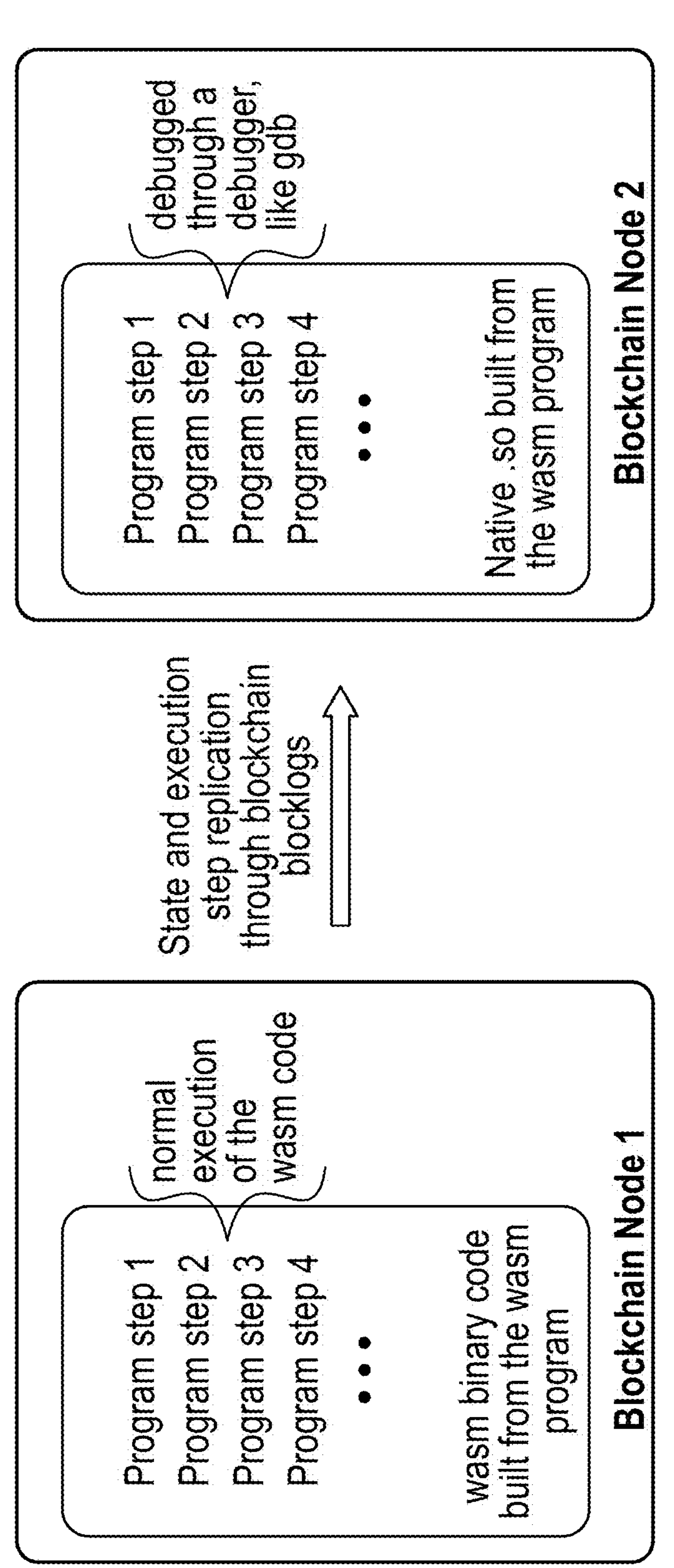

Referring to FIG. 4, FIG. 5, and FIG. 6, there are shown example use cases to illustrate the debugging functionality for the smart contract WASM binary and the equivalent native shared library code generated by a CDT compiler 22.

FIG. 4 shows a web browser example use case for the native x86 .so files, or native binary files in the format of a shared library. In this example, the native x86 .so files are built from the WASM code by CDT compiler 22. The web browser has an interface with visual elements corresponding to program steps of the native .so files built from the WASM code by the CDT compiler 22. The native .so files can have program step 1, program step 2, program step 3, program step 4, etc. that can be debugged through a debugger such as the GNU Debugger, for example.

FIG. 5 shows a blockchain node example use case for the native x86 .so files. The native x86 .so files are built from the same programming language (e.g., C++) source code that is used to generate the WASM code. In this example, debugging and execution are in the same blockchain node.

FIG. 6 shows another blockchain node example use case for the native x86 .so files. In this example, the execution is in blockchain node 1 by running the WASM binary code. The debugging is done in blockchain node 2 by running the native x86 .so code, with replicated states and steps as from node 1. As noted, the generated shared libraries and WASM binaries are from the same intermediate representation of the source code. This can support single step debugging, as the generated shared libraries and WASM binaries have the same execution behavior at each step and further since the deterministic execution of blockchain smart contracts requires the same inputs to generate the same outputs in both nodes 1 and 2, it enables single step debugging in node 2 and allows the programmer to observe and follow the corresponding C++ lines of source code along with variable values and function entry and exit values etc. enabling the programmer to find and correct the source of the execution logic error or performance issue.

In FIG. 5, the use case could be a running blockchain node in a development environment, either locally or remotely, and the execution of smart contract can be paused and resumed for single step debugging purposes. In FIG. 6, the use case could include node #1 as a blockchain node in a production environment, where smart contract WASM code can be deployed and its execution cannot be interrupted. The blockchain state and execution data on node #1 can be replicated and synced to node #2 in the development environment, where the same smart contract can be debugged as native code. Since the blockchain is a deterministic state machine, the same contract executed as WASM (.wasm file) and as the native shared library (.so file) must result in the same outcomes for the program. Embodiments described herein leverage this deterministic state machine feature of the blockchain to ensure that the debugging information generated from the shared library can be identical to that obtainable from the WASM file. Therefore the information from the WASM file and shared libraries can be identical.

Figure 7:
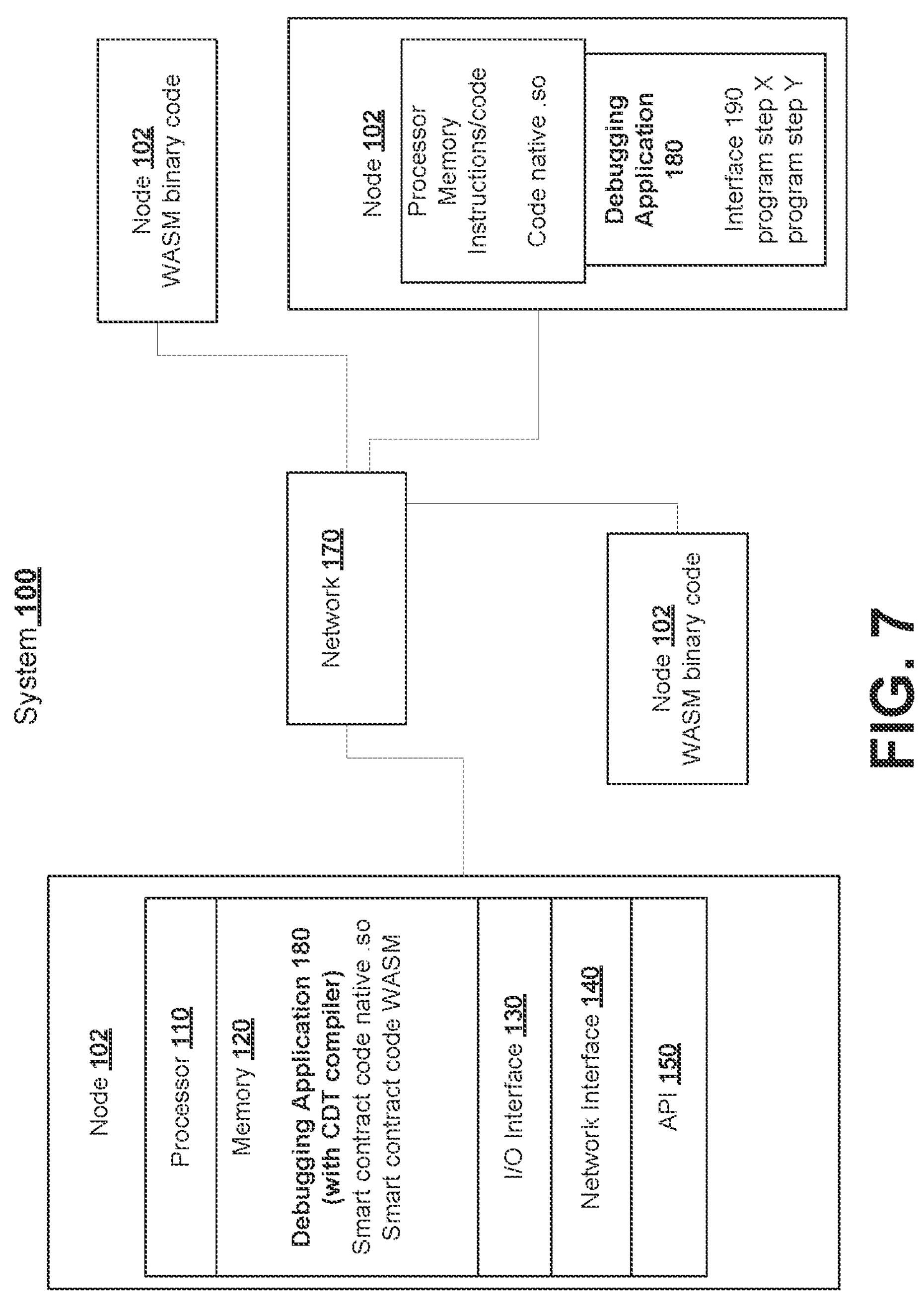
FIG. 7 shows an example system for debugging, testing, and/or improving performance of smart contract code.

FIG. 7 shows an example system 100 for debugging, testing, and/or improving performance of smart contract code. The system 100 has a plurality of nodes 102 connected by network. In some embodiments, node 102 (e.g., nodeos) is a component for the blockchain storage infrastructure for the system 100. The nodeos service manages nodes of the blockchain. In other embodiments, node 102 can implement WASM web applications.

An example node 102 has a memory 120 storing a debugging application 180, native x86 .so code, and WASM binary code corresponding to smart contract code. In some embodiments, the debugging application 180 includes a compiler (e.g. CDT compiler 22). In this example, debugging and execution can be implemented in the same node 102. As another example, execution can be implemented by another node 102 running the WASM binary code built by the compiler. A further node 102 can implement debugging by running the native x86 .so code built by the compiler. The node 102 with the debugging application 190 can have replicated states and steps as from the executing node 102. A debugger interface 190 can display visual elements corresponding to program steps X, . . . Y of the native x86 .so files. The debugger interface 190 can enable single step debugging by displaying execution of a single statement or step of code at a time, and the corresponding results. The debugger interface 190 can provide improved visualizations for debugging smart contract code and provides selectable indicia to send commands to the other nodes 102.

The system 100 can include at least one processor 110, memory 120, at least one I/O interface 130, at least one network interface 140, and an application programming interface (API) 150. The I/O interface 130 can enable system 100 to interconnect with one or more input devices, such as a keyboard, mouse, camera, touch screen and a microphone, or with one or more output devices such as a display screen and a speaker. The network interface 140 can enable system 100 to communicate with other components, to exchange data with other components, to access and connect to network resources, to serve applications, and perform other computing applications by connecting to a network 170 (or multiple networks, or a combination of different networks) capable of carrying data. The hardware components of system 100 may be connected in various ways including directly coupled, indirectly coupled via a network, and distributed over a wide geographic area and connected via a network (which may be referred to as "cloud computing"). For example, and without limitation, the system 100 may be a server, network appliance, embedded device, computer expansion module, or other computing device capable of being configured to carry out the methods described herein. Memory 120 can be distributed storage devices for a blockchain infrastructure or web applications. System 100 has distributed memory of nodes 102 to provide blockchain infrastructure.

The system 100 can connect to one or more electronic devices to exchange data. An electronic device can have memory storing instructions for applications and one or more processors that execute the instructions and debugging applications 180. The memory can store instructions for a debugger interface 190 to exchange data with the system 100 and display program steps for testing and debugging. The electronic device has an interface 190 to provide visualizations of data received from system 100. In an aspect, embodiments described herein provide a system 100 for interactively debugging code in non-native format inside native executables. For example, debugging can identify erroneous execution logic and/or performance issues in the code.

In some embodiments, the system 100 has a memory 120 for a shared library of native binaries; a hardware processor 110 executing instructions to provide a compiler 22 for converting source code for a code of smart contract code 20 in non-native format into a native binary in a format of the shared library 58; a host executable 102 to load the shared library 58 for execution of the smart contract code 20. Execution control is passed to the shared library 58; and an interactive debugger 180 attached to the host executable 102 for debugging the smart contract the host code execution of the host functions called by the smart contract code 20 to generate debugging data and/or execution traces and/or information on the relative performance of the non-native format (e.g., WebAssembly (WASM) 46) and shared library 58 execution of the same contracts 20. Accordingly, each individual node 102 (i.e. host executable) would be able to load the shared library and participate in the debugging.

In some embodiments, the non-native format is WebAssembly (WASM).

In some embodiments, the debugger 180 attached to the host executable 102 is configured for debugging by single stepping through the smart contract code 20.

In some embodiments, the compiler 22 automatically inserts execution traces in the smart contract code 20 without changing the base behaviour of the smart contract code 20.

In some embodiments, the hardware processor 110 automatically creates tracing code for the smart contract execution, wherein during execution of the smart contract code 20 the tracing code runs without changing logic of the smart contract code 20 to generate execution traces for the tracing.

In some embodiments, the compiler 22 converts the source code of the smart contract code 20 into a WASM binary 46 for execution in a WASM virtual machine of the host executable 102.

In some embodiments, the compiler 22 generates shared library binaries 58 and WASM binaries 46 from the same intermediate representation 34 of the smart contract source code 20, wherein, during execution, the generated shared library binaries 58 and WASM binaries 46 have the same execution behavior at each step.

In some embodiments, the compiler 22 inserts source-level debugging information into the native binary of the shared library 58.

In another aspect, embodiments described herein provide a system 100 for debugging smart contract code 20 of a trading platform with a blockchain infrastructure.

Figure 8:
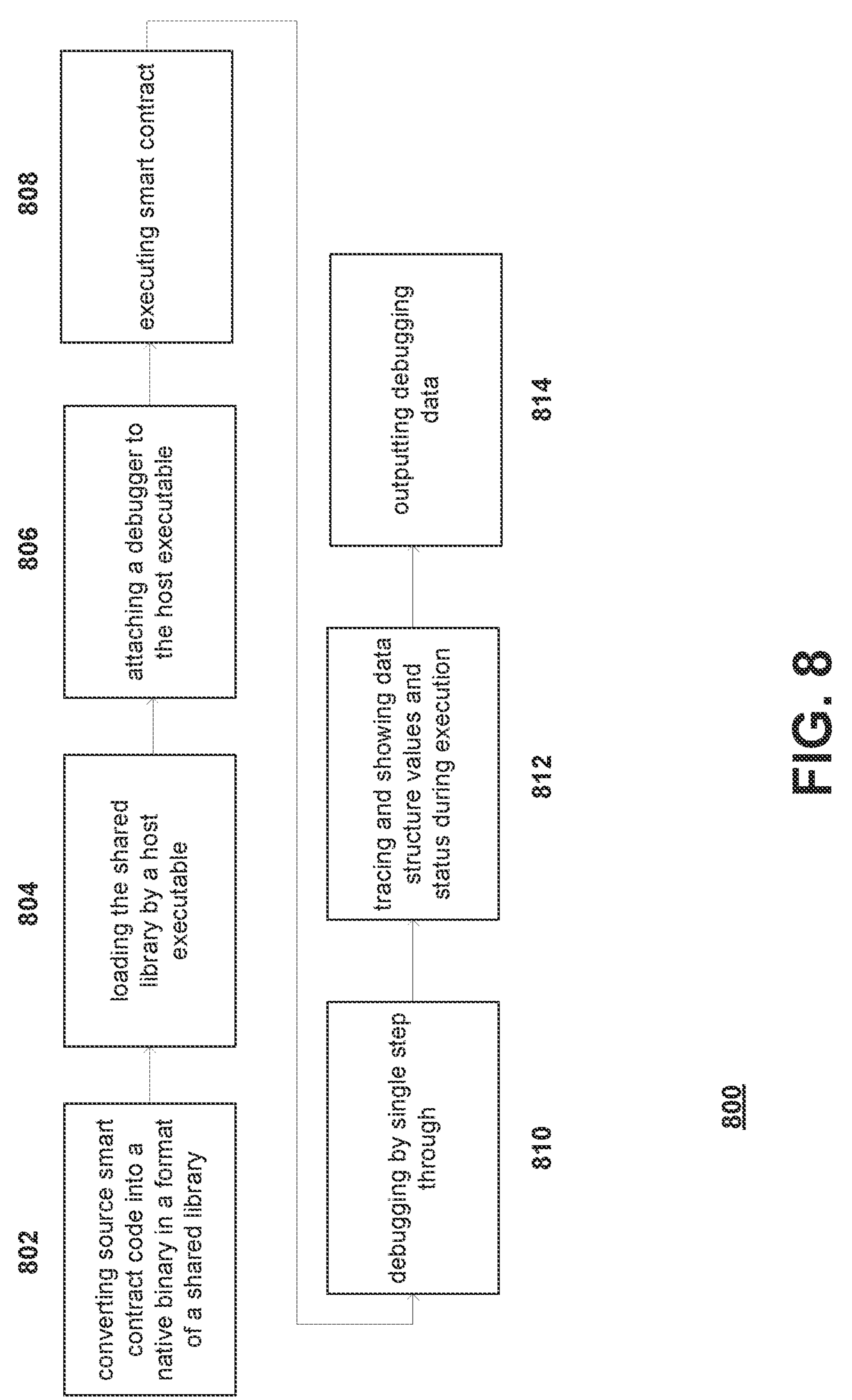
FIG. 8 shows an example method for debugging or testing smart contract code.

FIG. 8 shows an example method 800 for debugging or testing smart contract code to identify erroneous execution logic and/or performance issues in the code.

At 802, a compiler (e.g., compiler of system 100, CDT compiler 22) can convert source code of smart contract code into a native binary in a format of a shared library. The compiler can also convert the source code into WASM binaries for execution in a WASM virtual machine. The source code of smart contract code can be converted into a native binary in a format of a shared library that is functionally equivalent to the WASM format that would be executed on a blockchain. Converting the source code of the smart contract code into the native binary in the format of the shared library and the equivalent WebAssembly (WASM) binary can produce functionally equivalent code and this equivalence may be verifiable as both versions execute identically within the blockchain deterministic state machine and produce identical outputs for given inputs facilitating the use of debugging information made available by the native shared library binaries via interactive debuggers for further developing the smart contracts.

In some embodiments, converting the source code of the smart contract code into the native binary in the format of the shared library and the WebAssembly (WASM) binary involves generating shared library binaries and WASM binaries. The generated shared library binaries and the WASM binaries are from the same intermediate representation of the smart contract source code. During execution, the generated shared library binaries and WASM binaries can have the same execution behavior at each step and their identical execution behavior can further be verified by the deterministic blockchain based identical outputs being generated for identical inputs by both the WebAssembly (WASM) and shared libraries (.so files) generated from the same source programming language (e.g., C++) files.

At 804, system 100 can load the shared library using a blockchain host executable (e.g., nodeos, blockchain executable) when ready to load the smart contract for execution. Execution control can be passed to the shared library.

At 806, system 100 can attach an interactive debugger to the host executable. The debugger can enable debugging by single step through the smart contract code. For example, the debugger can be attached to the host executable by operating system calls, such as ptrace( ) which allow the debugger to observe and manipulate the execution of the host executable. The smart contract source code lines being executed, program variables values, and other execution details can be visible and controllable from within the interactive debugger. Debugging the smart contract code can be done in the host blockchain (nodeos) by following the host function calls (made by the smart contract) into the host.

At 808, system 100 can execute the smart contract code. The source smart contract code can call host functions during host code execution. The execution of smart contract can be paused and resumed for single step debugging purposes.

At 810, system 100 can debug by single stepping through the host code execution of the host functions called by the smart contract code. The debugging application 180 (e.g., interactive debugger) can trigger interface 190 to display program steps for single step through debugging. The debugging application 180 can execute a single statement of the code at a time to observe the results of each statement one by one. The debugging application 180 can step over to the next statement, or step into the called subroutine by current statement, to continue single step debugging. The debugging application 180 (e.g., using CDT compiler 22) can ensure the generated shared libraries and WASM binaries are from the same intermediate representation of the source code. Therefore, the generated shared libraries and WASM binaries can have the same execution behavior. This can be useful for single step debugging, as the generated shared libraries and WASM binaries have the same execution behavior (e.g., data structure values) at each single step.

At 812, system 100 can trace and show internal data structure values and status during execution of the smart contract code. The interface 190 can display the internal data structure values and status, for example. A smart contract compiler can automatically insert execution traces in the smart contract code prior to code compilation without changing the base behavior of the smart contract. The tracing code can be automatically created for the smart contract execution, such as function enter and exit traces, statement-level traces, and function parameter traces. When the smart contract is executed, the tracing code can also run (without changing the smart contract logic) and generate the execution trace. These traces can be used for debugging purpose. The tracing code can generate additional debug execution trace information at runtime including outputting line numbers of source code being executed, functions executed, values of variables used at run-time.

The debugger can provide a debug option for the native binary code. For example, a compiler flag that enables debugging can be added, so that source-level debugging data, such as descriptors for data types, variables, functions, and source files, can be inserted in the generated shared library binary. The debugging data can be used by the debugger.

At 814, system 100 can output debugging data generated during debugging and by tracing. System 100 can store the debugging data in memory 120, and/or transmit the debugging data to other systems.

The system 100 can compare execution of the smart contract code in one or more blockchain executables to identify performance differentials between WebAssembly (WASM) execution and with optimal performance execution achieved by native shared libraries (.so files).

In an aspect, embodiments described herein provide a method 800 for interactively debugging code in non-native format inside native executables e.g. to identify erroneous execution logic and/or performance issues in the code.

The method 800 can involve: converting source code of a smart contract in non-native format into a native binary in a format of a shared library that is functionally equivalent to the non-native format (e.g. WASM) that would be executed on a blockchain (block 802); loading the shared library by a blockchain host executable when ready to load the smart contract code for execution, wherein execution control is passed to the shared library (block 804); and attaching an interactive debugger to the host executable for debugging the smart contract code. The debugging can be of the smart contract source code lines being executed, program variables values, and other execution details are visible and controllable from within the interactive debugger (block 806). Converting the source code of the smart contract code into the native binary in the format of the shared library and the equivalent WASM binary (block 802) can produce functionally equivalent code that is verifiable as both versions execute identically within the blockchain host executable that is a deterministic state machine and produce identical outputs for given inputs facilitating use of debugging information made available by the native shared library binaries via the interactive debugger for further developing the smart contract.

In some embodiments, the non-native format is WebAssembly (WASM).

In some embodiments, the method 800 involves using the debugger to identify erroneous execution logic and/or performance issues in the code.

In some embodiments, the method 800 involves attaching the debugger to the host executable for debugging by single stepping through the smart contract code.

In some embodiments, the method 800 involves providing the smart contract source code lines being executed and program variables values as visible and controllable from within the interactive debugger.

In some embodiments, the method 800 involves attaching a debugger to native execution of smart contract code and iterating through program steps of the smart contract code.

In some embodiments, the method 800 involves comparing execution of the smart contract code in one or more blockchain executables to identify performance differentials between WebAssembly (WASM) execution and optimal performance execution achieved by native shared libraries.

In some embodiments, the method 800 involves automatically inserting execution traces in the smart contract code prior to code compilation without changing the base behaviour of the smart contract code to generate additional debug execution trace information at runtime including outputting line numbers of source code being executed, functions executed, values of variables used at run-time, etc.

In some embodiments, the method 800 involves debugging by single stepping through host code execution of the host functions called by the smart contract (block 810).

In some embodiments, the method 800 involves converting the source code of the smart contract code into a WebAssembly (WASM) binary for execution in a WASM virtual machine of the host executable.

In some embodiments, the method 800 involves converting the source code of the smart contract code into the native binary in the format of the shared library and the WASM binary (block 802) includes generating shared library binaries and WASM binaries, wherein the generated shared library binaries and the WASM binaries are from the same intermediate representation of the smart contract source code, wherein, during execution, the generated shared library binaries and WASM binaries have the same execution behavior at each step and their identical execution behavior can further be verified by the deterministic blockchain based identical outputs being generated for identical inputs by both the WebAssembly (WASM) and shared libraries generated from the same source files.

In some embodiments, the converting (block 802) further involves inserting source-level debugging information into the native binary in the format of the shared library to facilitate working with the interactive debugger.

In another aspect, embodiments described herein provide a method 800 for interactively debugging non-native code inside native executables to identify erroneous execution logic in the code or performance issues. The method 800 involves debugging by single stepping through shared library binaries of the code during host code execution of smart contracts (block 810), and/or generating execution tracing information (block 812), and/or comparing relative performance of the non-native code and native shared library execution of identical contracts.

In a further aspect, embodiments described herein provide a method 800 for debugging smart contract code of a trading platform with a blockchain infrastructure. The method 800 involves: converting source code of smart contract code into native binaries for execution in a shared library of a host executable (block 802) and converting the source code of the smart contract code into WASM binaries for execution in a WASM virtual machine of the host executable; and debugging by single step through host code execution of host functions called by the smart contract code (block 810), and tracing and showing internal data structure and status during execution of the smart contract code (block 812); wherein the blockchain infrastructure is a deterministic state machine, wherein the smart contract code executed as the WASM binaries and the native binaries of the shared library result in the same outcomes for the smart contract code; and wherein debugging information and/or execution traces and/or information on the relative performance of WebAssembly (WASM) versus native shared library execution of the same contracts can be generated.

In a further aspect, embodiments described herein provide a non-transitory machine readable medium having stored thereon a plurality of instructions that, when executed by at least one computing device, cause the at least one computing device to perform a method 800 described herein.

Figure 9:
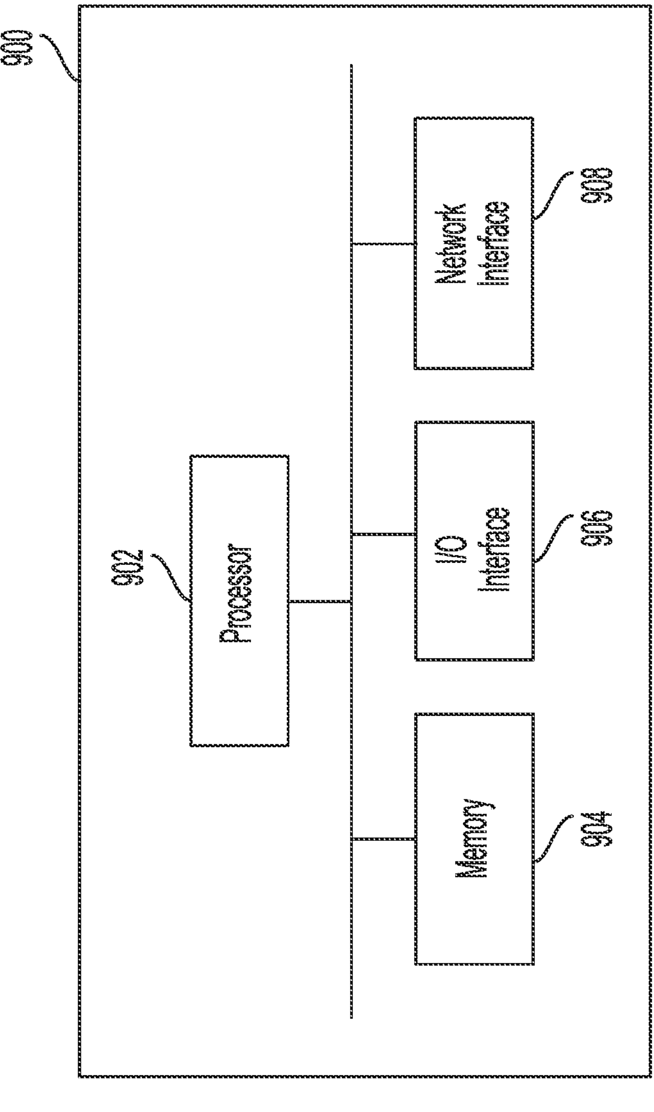
FIG. 9 shows a schematic diagram of an electronic device for debugging smart contract code.

FIG. 9 is a schematic diagram of an electronic device 900 for debugging smart contract code. As depicted, electronic device 900 includes at least one processor 902, memory 904, at least one I/O interface 906, and at least one network interface 908.

Each processor 902 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 904 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 906 can enable electronic device 900 to interconnect with one or more input devices, such as a keyboard, mouse, camera, touch screen and a microphone, or with one or more output devices such as a display screen and a speaker.

Each network interface 908 can enable electronic device 900 to communicate with other components, to exchange data with other components, to access and connect to network resources, to serve applications, and perform other computing applications by connecting to a network (or multiple networks) capable of carrying data.

In an aspect, there is provided a method for debugging smart contract code of a trading platform with a blockchain infrastructure. The method can involve: converting source code of smart contract code into native binaries for execution in a shared library of a host executable and converting the source code of the smart contract code into non-native binaries for execution in a virtual machine of the host executable; and debugging by single step through host code execution of host functions called by the smart contract code, and tracing and showing internal data structure and status during execution of the smart contract code. The blockchain infrastructure is a deterministic state machine, and the smart contract code executed as the WASM binaries and the native binaries of the shared library result in the same outcomes for the smart contract code. Debugging information and/or execution traces and/or information on the relative performance of non-native format versus native shared library execution of the same contracts can be generated.

In an aspect, there is provided a system for debugging smart contract code of a trading platform with a blockchain infrastructure.

In an aspect, there is provided a non-transitory machine readable medium having stored thereon a plurality of instructions that, when executed by at least one computing device, cause the at least one computing device to perform one or more methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide better memory usage, improved processing, improved bandwidth usage.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A method for interactively debugging code in non-native format inside native executables, the method comprising:

converting source code of a smart contract in non-native format into a native binary in a format of a shared library that is functionally equivalent to the non-native format that would be executed on a blockchain;

loading the shared library by a blockchain host executable when ready to load smart contract code for execution, wherein execution control is passed to the shared library to execute the smart contract code as native instructions;

attaching an interactive debugger to the host executable for debugging the smart contract code, wherein the smart contract source code lines are visible and controllable from within the interactive debugger;

wherein converting the source code of the smart contract code into the native binary in the format of the shared library and the equivalent non-native binary produces functionally equivalent code that is verifiable as both versions execute identically within the blockchain host executable that is a deterministic state machine and produce identical outputs for given inputs facilitating use of debugging information made available by the native shared library binaries via the interactive debugger for further developing the smart contract; and automatically inserting execution traces in the smart contract code prior to code compilation without changing the base behaviour of the smart contract code.

2. The method of claim 1 wherein the non-native format is WebAssembly (WASM).

3. The method of claim 1 further comprising using the interactive debugger to identify erroneous execution logic and/or performance issues in the code.

4. The method of claim 1 further comprising attaching the interactive debugger to the host executable for debugging by single stepping through the smart contract code.

5. The method of claim 1 further comprising providing the smart contract source code lines being executed and program variables values as visible and controllable from within the interactive debugger.

6. The method of claim 1 comprising attaching a debugger to native execution of smart contract code and iterating through program steps of the smart contract code.

7. The method of claim 1 comprising comparing execution of the smart contract code in one or more blockchain executables to identify performance differentials between WebAssembly (WASM) execution and optimal performance execution achieved by native shared libraries.

8. The method of claim 1 wherein automatically inserting the execution traces in the smart contract code generates additional debug execution trace information at runtime including outputting line numbers of source code being executed, functions executed, values of variables used at run-time, etc.

9. The method of claim 1 further comprising debugging by single stepping through host code execution of the host functions called by the smart contract.

10. The method of claim 1 further comprising converting the source code of the smart contract code into a WebAssembly (WASM) binary for execution in a WASM virtual machine of the host executable.

11. The method of claim 10 wherein converting the source code of the smart contract code into the native binary in the format of the shared library and the WASM binary comprises generating shared library binaries and WASM binaries, wherein the generated shared library binaries and the WASM binaries are from the same intermediate representation of the smart contract source code, wherein, during execution, the generated shared library binaries and WASM binaries have the same execution behavior at each step and their identical execution behavior can further be verified by deterministic blockchain based identical outputs being generated for identical inputs by both the WASM and shared libraries generated from the same source files.

12. The method of claim 1 wherein the converting further comprises inserting source-level debugging information into the native binary in the format of the shared library to facilitate working with the interactive debugger.

13. A method for interactively debugging non-native code inside native executables to identify erroneous execution logic in the non-native code or performance issues, the method comprising debugging by single stepping through shared library binaries of the non-native code during host code execution of smart contracts as native instructions, and/or generating execution tracing information, and/or comparing relative performance of the non-native code and native shared library execution of identical contracts.

14. A system for interactively debugging code in non-native format inside native executables, the system comprising:

a memory for a shared library of native binaries;

a hardware processor executing instructions to provide a compiler for converting source code for smart contract code in non-native format into a native binary in a format of the shared library;

a host executable to load the shared library for execution of smart contract code as native instructions, wherein execution control is passed to the shared library; and an interactive debugger attached to the host executable for debugging the smart contract by host code execution of host functions called by the smart contract code to generate one or more of debugging data, execution traces, and information on the relative performance of the non-native format and shared library execution of the same contracts;

wherein the compiler automatically inserts execution traces in the smart contract code without changing the base behaviour of the smart contract code.

15. The system of claim 14 wherein the non-native format is WebAssembly (WASM).

16. The system of claim 14 wherein the interactive debugger attached to the host executable is configured for debugging by single stepping through the smart contract code.

17. The system of claim 14 wherein the hardware processor automatically creates tracing code for the smart contract code execution, wherein during execution of the smart contract code the tracing code runs without changing logic of the smart contract code to generate execution traces for the tracing code.

18. The system of claim 14 wherein the compiler converts the source code of the smart contract code into a WASM binary for execution in a WASM virtual machine of the host executable.

19. The system of claim 18 wherein the compiler generates shared library binaries and WASM binaries from the same intermediate representation of the smart contract source code, wherein, during execution, the generated shared library binaries and WASM binaries have the same execution behavior at each step, wherein the compiler inserts source-level debugging information into the native binary of the shared library.

* * * * *